United States Patent
Yang et al.

(10) Patent No.: US 12,231,702 B2
(45) Date of Patent: Feb. 18, 2025

(54) INSERTING DIGITAL CONTENTS INTO A MULTI-VIEW VIDEO

(71) Applicant: Microsoft Technology Licensing, LLC, Redmond, WA (US)

(72) Inventors: Jie Yang, Redmond, WA (US); Qi Zhang, Redmond, WA (US); Guosheng Sun, Redmond, WA (US); Gaoyuan Zhang, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 8 days.

(21) Appl. No.: 18/031,809

(22) PCT Filed: Aug. 31, 2021

(86) PCT No.: PCT/US2021/048315
§ 371 (c)(1),
(2) Date: Apr. 13, 2023

(87) PCT Pub. No.: WO2022/103471
PCT Pub. Date: May 19, 2022

(65) Prior Publication Data
US 2023/0388563 A1    Nov. 30, 2023

(30) Foreign Application Priority Data
Nov. 12, 2020   (CN) ................. 202011261202.3

(51) Int. Cl.
*H04N 21/234* (2011.01)
*A63F 13/86* (2014.01)
*H04N 21/258* (2011.01)
*H04N 21/81* (2011.01)

(52) U.S. Cl.
CPC ....... *H04N 21/23424* (2013.01); *A63F 13/86* (2014.09); *H04N 21/23418* (2013.01); *H04N 21/25891* (2013.01); *H04N 21/816* (2013.01)

(58) Field of Classification Search
CPC ............................................... H04N 21/23424
See application file for complete search history.

(56) References Cited

U.S. PATENT DOCUMENTS

| 9,078,048 | B1 | 7/2015 | Gargi |
| 10,300,394 | B1 * | 5/2019 | Evans ............... A63F 13/86 |
| 2014/0363143 | A1 | 12/2014 | Dharssi |
| 2017/0278289 | A1 | 9/2017 | Marino et al. |

(Continued)

OTHER PUBLICATIONS

Office Action Received for Chinese Application No. 202011261202.3, mailed on Dec. 7, 2023, 11 pages (English Translation Provided).

(Continued)

*Primary Examiner* — Michael H Hong
(74) *Attorney, Agent, or Firm* — Schwegman Lundberg & Woessner. P.A.

(57) ABSTRACT

The present disclosure provides methods and apparatuses for inserting digital contents into a multi-view video. The multi-view video may comprise a plurality of views. At least one target region in the plurality of views may be identified. At least one digital content to be inserted may be determined. The multi-view video may be updated through adding the at least one digital content into the at least one target region.

15 Claims, 6 Drawing Sheets

(56) References Cited

U.S. PATENT DOCUMENTS

2019/0075339 A1* 3/2019 Smith .............. H04N 21/25883
2019/0222776 A1   7/2019 Carter
2020/0154156 A1   5/2020 Roach

OTHER PUBLICATIONS

"International Search Report and Written Opinion Issued in PCT Application No. PCT/US21/048315", Mailed Date: Nov. 3, 2021, 10 Pages.
Notice of Grant Received for Chinese Application No. 202011261202.3, mailed on Apr. 8, 2024, 7 pages.

* cited by examiner

INSERTING DIGITAL CONTENTS INTO A MULTI-VIEW VIDEO

CROSS-REFERENCE TO RELATED APPLICATION

This application is a U.S. National Stage Filing under 35 U.S.C. 371 of International Patent Application Serial No. PCT/US2021/048315, filed Aug. 31, 2021, and published as WO 2022/103471 A1 on May 19, 2022, which application claims the benefit of priority of Chinese Application Serial No. 202011261202.3, Nov. 12, 2020, which applications and publication are hereby incorporated by reference in their entirety.

BACKGROUND

With the development of digital devices, video processing techniques, network techniques, etc., people can conveniently watch various types of video on the network. Herein, videos may broadly refer to various visual contents that can be presented on a terminal device of a user, e.g., movies, video news, variety shows, video lectures, game interfaces, online education videos, etc. Video providers may provide videos on the network through various approaches, e.g., streaming media, video files, etc. In some cases, specific digital contents may be inserted into a video, so that a viewer can watch not only the video, but also the inserted digital contents.

SUMMARY

This Summary is provided to introduce a selection of concepts that are further described below in the Detailed Description. It is not intended to identify key features or essential features of the claimed subject matter, nor is it intended to be used to limit the scope of the claimed subject matter.

Embodiments of the present disclosure propose methods and apparatuses for inserting digital contents into a multi-view video. The multi-view video may comprise a plurality of views. At least one target region in the plurality of views may be identified. At least one digital content to be inserted may be determined. The multi-view video may be updated through adding the at least one digital content into the at least one target region.

It should be noted that the above one or more aspects comprise the features hereinafter fully described and particularly pointed out in the claims. The following description and the drawings set forth in detail certain illustrative features of the one or more aspects. These features are only indicative of the various ways in which the principles of various aspects may be employed, and this disclosure is intended to include all such aspects and their equivalents.

BRIEF DESCRIPTION OF THE DRAWINGS

The disclosed aspects will hereinafter be described in conjunction with the appended drawings that are provided to illustrate and not to limit the disclosed aspects.

DETAILED DESCRIPTION

Figure 1:
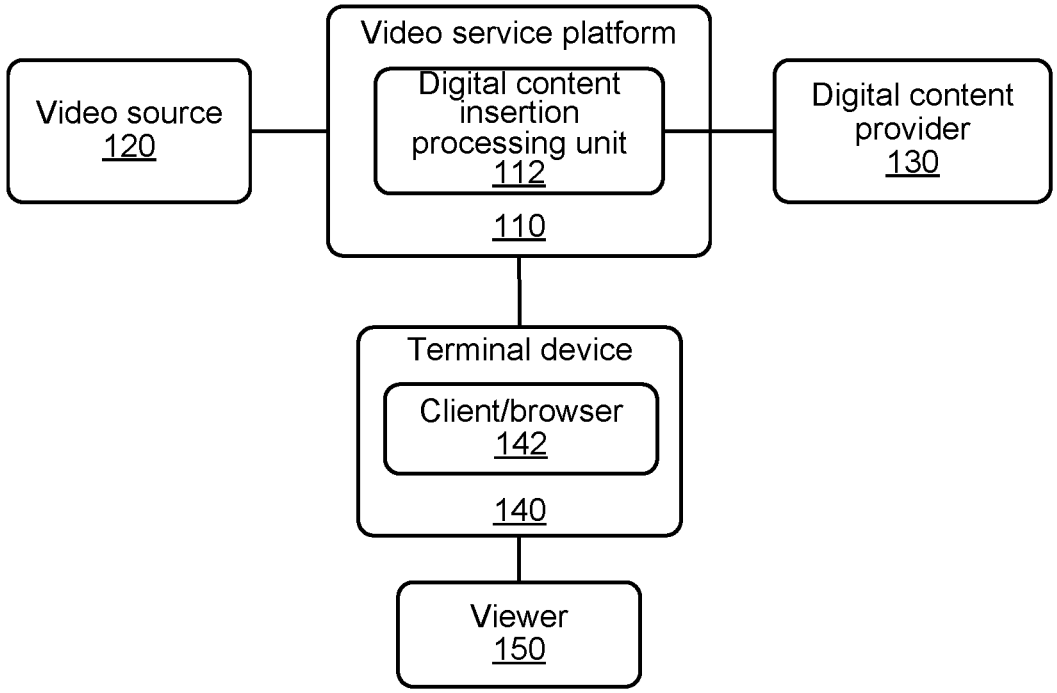
FIG. 1 illustrates exemplary video service network architectures according to embodiments.
Figure 1:
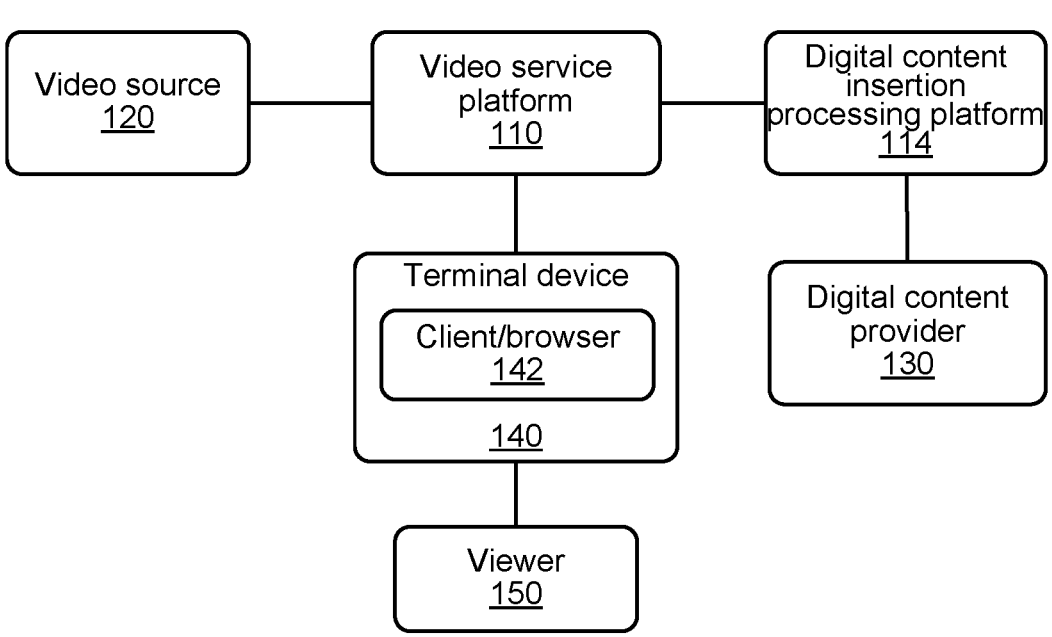

The present disclosure will now be discussed with reference to several example implementations. It is to be understood that these implementations are discussed only for enabling those skilled in the art to better understand and thus implement the embodiments of the present disclosure, rather than suggesting any limitations on the scope of the present disclosure.

There are some existing approaches for inserting digital contents into a video. An existing approach may provide digital contents independently of video frames, e.g., playing separate digital content frames in the approach of pre-roll, mid-roll or post-roll. Another existing approach may provide digital contents over a view of a video frame in a floating approach, e.g., playing a digital content through floating the digital content over a part of the view in the video. These existing approaches for inserting digital contents into a video can only provide digital contents along with a video with limited presentation effects. Moreover, these existing approaches will affect viewing experiences of video viewers in different degrees, e.g., occupying extra time, obstructing viewing sight line, etc.

Embodiments of the present disclosure propose an improved approach for inserting digital contents into a video, and in particular, propose a mechanism for effectively inserting digital contents into a multi-view video.

Herein, a multi-view video may broadly refer to a video in which video frames include a plurality of views, e.g., a video that contains two or more views. Each view in a multi-view video corresponds to a video stream. Accordingly, a multi-view video may be formed by merging a plurality of video streams. Each video stream may be presented in a corresponding view in the multi-view video, so that the multi-view video may achieve simultaneous presentations of the plurality of video streams in the plurality of views.

A multi-view video may contain two views, in which case it may also be referred to as a dual-view video. An exemplary dual-view video is a live streaming video. For example, streaming videos provided by some streaming platforms may include a streaming view for presenting streaming content videos and a streamer view for presenting streamer videos. Taking a game streaming video as an example, it may include a game view for presenting a game video and a game player view for presenting a game player video. Taking an online education streaming video as an example, it may include a course view for presenting a course content video and a teacher view for presenting a teacher video. In some cases, two views in a dual-view video may have different sizes, and accordingly, the view occupying a larger region of a screen may be referred to as a main view, and the view occupying a smaller region of the screen may be referred to as a secondary view. For example, in a game streaming video, the game view usually occupies a larger region of the screen, so it may be considered as the main view, while the game player view usually occupies a smaller region of the screen, so it may be considered as the secondary view. In some cases, two views in a dual-view video may have the same or similar size. For example, in a debate video involving two debating parties, there may be two views of the same size corresponding to the two debating parties respectively, for presenting close-up videos of the two debaters respectively, and these two videos may be synchronized in time.

A multi-view video may contain three or more views. Taking a news comment video as an example, assuming that a host interviews two guests remotely at the same time, the video may contain three views corresponding to the host, the first guest and the second guest respectively, and these three views present a video of the host, a video of the first guest and a video of the second guest respectively. In different situations, three or more views contained in a multi-view video may have the same size or different sizes from each other.

It should be understood that the multi-view videos involved in the embodiments of the present disclosure are not limited to the above examples, but may cover multi-view videos containing any number of views in any application scenario. Moreover, the multi-view videos in the embodiments of the present disclosure may be live videos or previously-recorded videos.

Herein, digital contents may broadly refer to contents intended to be presented along with multi-view videos for various purposes, e.g., commercial information, public service announcements, etc. Formats of digital content may include image, video, animation, etc. The embodiments of the present disclosure are not limited by any specific purpose of or any specific format of digital contents.

In an aspect, the embodiments of the present disclosure may identify target regions, into which digital contents are to be added, from a plurality of views contained in a multi-view video. The target regions may be detected quadrilateral regions, quadrilateral regions created in detected plane regions, etc. The target regions may be determined with reference to marked regions that were designated previously, or may be automatically detected or created.

In an aspect, the embodiments of the present disclosure may update a multi-view video through adding digital contents into target regions, thereby obtaining the updated multi-view video. Digital contents may be added into the target regions in an immersive approach, a floating approach, etc. In an implementation, configuration information may be generated based on the identified target regions and the determined digital contents, wherein the configuration information may be further used for performing rendering so as to update the multi-view video.

In an aspect, the embodiments of the present disclosure may select and provide corresponding digital contents for different viewers. For example, specific digital contents for a specific viewer may be selected based on a profile of the viewer.

Through the embodiments of the present disclosure, digital contents may be naturally and smoothly integrated into multi-view videos, thereby avoiding the problems such as occupying extra time, obstructing viewing sight line, etc., and achieving better viewing experiences. Since digital contents may be added into multi-view videos more effectively, it may attract more attention from viewers, achieve better digital content pushing effects, etc.

It should be understood that although multiple parts of the following discussion take game streaming videos containing a game view and a streamer view as an example, the embodiments of the present disclosure are not limited to this, but may be similarly applied to multi-view videos containing any number of views in any other application scenarios.

FIG. 1 illustrates exemplary video service network architectures 102 and 104 according to embodiments. These architectures may provide a multi-view video attached with digital contents to a viewer.

In the architecture 102, various network entities may be interconnected directly or through the network. A video service platform 110 may refer to a website, server, etc. that is capable of providing various video services to viewers on the network. A video service may include, e.g., providing multi-view videos to viewers. As an example, the video service platform 110 may be a live streaming platform which may provide multi-view videos, and the multi-view videos may include, e.g., a streaming view for presenting streaming content videos, a streamer view for presenting streamer videos, etc. For example, the live streaming platform may be a live game streaming website which may present, in a game view of a multi-view video, a game video that a game player is playing, and present, in a game player view, a synchronized video of the game player. Therefore, viewers of the multi-view video may not only watch the video about the game content, but also watch the video of the game player during playing the game. It should be understood that the video service platform 110 may provide multi-view videos including two or more views to viewers. Still taking the live game streaming website as an example, multi-view videos provided by the website may include not only a game view and a game player view, but also other views, e.g., a commentator view for presenting a video of a commentator.

The video service platform 110 may obtain, from a video source 120, a multi-view video to be provided to viewers. The video source 120 may represent various network entities capable of providing multi-view videos to the video service platform 110. For example, the video source 120 may be a terminal device of a video content creator, wherein after the video content creator creates or records a video, a multi-view video that mixes the created video, the creator's own video, etc., may be generated and uploaded to the video service platform 110 through the terminal device. For example, the video source 120 may be a video supply platform that may collect or generate multi-view videos in various approaches, and provide these multi-view videos to the video service platform 110. It should be understood that although the video source 120 is shown as being independent of the video service platform 110, the video source 120 may also be fully or partially included in the video service platform 110 in terms of functionality. For example, assuming that the video source 120 is a terminal device of a video content creator, the creator may separately provide a created video, a creator video, etc. to the video service platform 110 without generating a multi-view video on the terminal device, instead, a multi-view video is generated by the video service platform 110 based on the received created video, creator video, etc. For example, the video service platform 110 itself may supply videos, i.e., the video service platform may also serve as a video source to generate multi-view videos.

The video service platform 110 may include a digital content insertion processing unit 112 for implementing processing related to inserting digital contents into a multi-view video. In one case, the digital content insertion processing unit 112 may identify target regions in the original multi-view video to be provided to a viewer by the video service platform 110, e.g., identify target regions in a plurality of views contained in the multi-view video. A target region indicates a position where a digital content will be inserted into the multi-view video. In one case, the digital content insertion processing unit 112 may obtain candidate digital contents from, e.g., a digital content provider 130, and determine, from the candidate digital contents, digital contents to be inserted. The digital content provider 130 may refer to various network entities that are capable of providing digital contents, e.g., terminal devices, network platforms, etc. operated by creators, owners, operators, etc. of the digital contents. In one case, the digital content insertion processing unit 112 may generate configuration information based on the identified target regions and the determined digital contents, wherein the configuration information indicates what digital contents are to be added and how to add the digital contents into the target regions. It should be understood that, in different implementations, the digital content insertion processing unit 112 may support a part or all of the functions described above.

The video service provided by the video service platform 110 may include adding digital contents into target regions based on configuration information so as to update a multi-view video, and the updated multi-view video is a multi-view video attached with digital contents. In one case, the video service platform 110 may directly perform platform-side rendering based on the configuration information so as to update the multi-view video, and provide the updated multi-view video to a terminal device of a viewer. In one case, the video service platform 110 may send the original multi-view video and the configuration information to a terminal device of a viewer and trigger terminal-side rendering based on the configuration information, so as to update the multi-view video on the terminal device of the viewer.

It is assumed that a viewer 150 requests the video service platform 110 for a multi-view video of interest through a terminal device 140. The terminal device 140 may be any type of electronic computing device that is capable of accessing servers or websites on the network and presenting multimedia contents, e.g., a smart phone, a desktop computer, a notebook computer, a tablet computer, an AI terminal, a smart TV, etc. The terminal device 140 may include a video service client/browser 142. The video service client may cooperate with the video service platform 110 to provide a video service to the viewer 150. For example, the video service client may be a software or application installed on the terminal device 140, which is dedicated to interacting with the video service platform 110 to provide a video service. Accordingly, the video service client may be logically regarded as a part of the video service platform. Optionally, the viewer 150 may also obtain the video service through a browser on the terminal device 140. For example, through the browser, the viewer 150 may access the video service platform 110 and watch the obtained multi-view video. Accordingly, when accessing the video service platform through the browser, the video service platform may invoke functions and processing capabilities provided by the browser to jointly provide the video service to the viewer. According to the embodiments of the present disclosure, the client/browser 142 may support processing related to inserting digital contents into a multi-view video. In one case, the client/browser 142 may receive, from the video service platform 110, an original multi-view video requested by the viewer, and identify target regions from the original multi-view video. In one case, the client/browser 142 may perform terminal-side rendering based on configuration information formed by the target regions and digital contents, so as to obtain the updated multi-view video attached with the digital contents, and play it for the viewer 150. In one case, if the video service platform 110 provides the terminal device 140 with an updated multi-view video attached with digital contents, the client/browser 142 may directly play the updated multi-view video for the viewer 150. It should be understood that, in different implementations, the client/browser 142 may support a part or all of the functions described above.

Under the architecture 102, a multi-view video attached with digital contents may be provided to a viewer in various implementations. In these implementations, each network entity in the architecture 102 may include more or less functions related to inserting digital contents into a multi-view video.

In an implementation, after the video service platform 110 determines an original multi-view video requested by the viewer 150, the video service platform 110 may send the original multi-view video to the client/browser 142 on the terminal device 140. The client/browser 142 may identify target regions from the original multi-view video. The digital content insertion processing unit 112 in the video service platform 110 may determine digital contents to be inserted, and send the determined digital contents to the client/browser 142. The client/browser 142 may generate configuration information with the identified target regions and the received digital contents, and perform terminal-side rendering based on the configuration information, so as to obtain an updated multi-view video attached with the digital contents, and play it for the viewer 150.

In an implementation, after the video service platform 110 determines an original multi-view video requested by the viewer 150, the digital content insertion processing unit 112 may identify target regions from the original multi-view video. The digital content insertion processing unit 112 may also determine digital contents to be inserted. The video service platform 110 may send the identified target regions and the determined digital contents as configuration information to the client/browser 142 on the terminal device 140. The client/browser 142 may perform terminal-side rendering based on the received configuration information, so as to obtain an updated multi-view video attached with the digital contents, and play it for the viewer 150.

In an implementation, after the video service platform 110 determines an original multi-view video requested by the viewer 150, the digital content insertion processing unit 112 may identify target regions from the original multi-view video, and determine digital contents to be inserted. The video service platform 110 may generate configuration information with the identified target regions and the determined digital contents, and perform platform-side rendering based on the configuration information, so as to obtain an updated multi-view video attached with the digital contents. The video service platform 110 may send the updated multi-view video to the client/browser 142 on the terminal device 140, so that the client/browser 142 may play the updated multi-view video for the viewer 150.

It should be understood that all the network entities included in the architecture 102 are exemplary, and according to actual application scenarios and requirements, the architecture 102 may include more or less network entities, and these network entities may be combined and separated in any approaches. Moreover, although only one terminal device 140 is shown in the architecture 102, there may be a different number of terminal devices connected to the video service platform 110 through the network. Moreover, although the digital content provider 130 is shown as a single network entity, it may also represent multiple network entities capable of providing digital contents.

It should be understood that although the digital content insertion processing unit 112 is included in the video service platform 110 in the architecture 102 to implement processing related to inserting digital contents into a multi-view video, the digital content insertion processing unit 112 may also be a separate network entity independent of the video service platform 110. For example, as shown in the architecture 104, a digital content insertion processing platform 114 may implement processing related to inserting digital contents into a multi-view video. The digital content insertion processing platform 114 may implement functions similar to the digital content insertion processing unit 112 in the architecture 102, but it is a network entity independent of the video service platform 110. In the architecture 104, the video service platform 110 may cooperate with the digital content insertion processing platform 114 or invoke functions and processing capabilities of the digital content insertion processing platform 114, so as to implement digital content insertion in multi-view videos and provide multi-view videos attached with digital contents to viewers. The digital content insertion processing platform 114 may communicate with the terminal device 140 via the video service platform 110, or directly communicate with the terminal device 140. Similar to the above discussion in conjunction with the digital content insertion processing unit 112, in different implementations, the digital content insertion processing platform 114 may perform more or less functions related to inserting digital contents into a multi-view video. For example, the digital content insertion processing platform 114 may determine digital contents to be inserted for an original multi-view video obtained from the video service platform 110, and send the determined digital contents to the video service platform 110, or to the client/browser 142 via the video service platform 110 or directly. For example, the digital content insertion processing platform 114 may identify target regions and determine digital contents to be inserted for an original multi-view video obtained from the video service platform 110, and send the identified target regions and the determined digital contents to the video service platform 110, or to the client/browser 142 via the video service platform 110 or directly. It should be understood that other network entities and their operations in the architecture 104 may be similar to the network entities and their operations in the architecture 102. Moreover, it should be understood that, in the case of adopting the independent digital content insertion processing platform 114, the digital content insertion processing platform 114 may also obtain an original video from the video source 120 directly, and perform the above processing related to inserting digital contents into a multi-view video, so as to generate an updated multi-view video.

Figure 2:
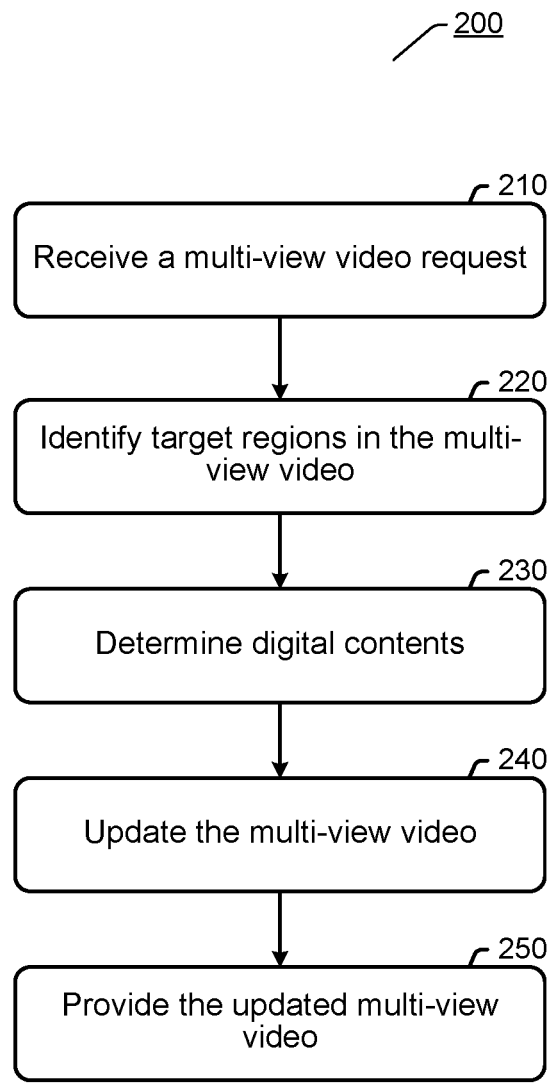
FIG. 2 illustrates an exemplary process of providing a multi-view video attached with digital contents according to an embodiment.

FIG. 2 illustrates an exemplary process 200 of providing a multi-view video attached with digital contents according to an embodiment. Through the process 200, a multi-view video attached with digital contents may be provided to a viewer in response to the viewer's request for a multi-view video.

At 210, a multi-view video request may be received from, e.g., a user of a video service platform. Taking a live game streaming website as an example, a user may want to watch a certain player's live streaming for a specific game, so the user may request the live game streaming platform for a corresponding game streaming video. The user is also considered as a viewer of the game streaming video.

At 220, one or more target regions in the requested multi-view video may be identified. For example, target regions in a plurality of views contained in the multi-view video may be identified. Taking a game streaming video as an example, target regions in a game view and a streamer view contained in the game streaming video may be identified. In an implementation, a target region has a specific time span, e.g., the target region appears in multiple consecutive frames. Therefore, a target region determined at 220 may refer to a target region within a set of frames in the multi-view video. That is, for a certain target region identified in a specific set of frames, a digital content may be added and presented in the target region during the playing of the set of frames.

The target regions may be various regions in the multi-view video, which are suitable for adding digital contents. In an implementation, the identification of the target regions at 220 may include detecting existing quadrilateral regions in the multi-view video as the target regions. A multi-view video may include some quadrilateral regions with clear boundaries, e.g., billboards, picture frames, screens, etc., and these quadrilateral regions may be used as the target regions for presenting digital contents. In an implementation, the identification of the target regions at 220 may include detecting plane regions in the multi-view video, and creating quadrilateral regions in the detected plane regions as the target regions. A plane region may broadly refer to, e.g., a blank region, a stable region, etc. in a view. A blank region may refer to a region that contains no object or only contain inconspicuous objects, e.g., a blank background, etc., while a stable region may refer to a region in which objects do not produce obvious relative movements, e.g., a part of a field region in a football field where no football player appears but only grassland is presented, a grandstand region of a stadium, etc. A quadrilateral region may be created in a plane region according to predetermined criteria as a target region, e.g., a quadrilateral region may be created as large as possible in the plane region as a target region, a quadrilateral region with a predetermined size may be created in the plane region as a target region, etc. Moreover, the created quadrilateral region may have the same or similar inclination, viewing angle, etc., as the plane region. It should be understood that although the above parts and other parts in this disclosure mention that the shape of a target region is quadrilateral, the target region may also have any other shape suitable for presenting a corresponding digital content, e.g., circle, triangle, other predetermined shapes, etc. Moreover, optionally, when a plurality of target regions are identified at 220, these target regions may be ranked according to predetermined criteria, e.g., ranked based on area, position, inclination, etc. Then, target regions that will be actually used later may be selected from these target regions automatically or artificially.

In some implementations, a target region identifying strategy especially directing to a multi-view video may be implemented. For example, at least in consideration of a viewer's attention to different views in a multi-view video, different weights may be set for the target regions identified from different views in the multi-view video, and target regions that will be actually used later may be selected from the weighted target regions. Taking a dual-view video including a main view and a secondary view as an example, since the main view occupies a larger region of a screen, and the secondary view occupies a smaller region of the screen, a target region identified in the main view generally has a larger area than a target region identified in the secondary view. However, considering that the viewer may pay equal attention to the secondary view as to the main view, it is also important and meaningful to provide digital contents in the smaller target region within the secondary view. Based on the above reasons, during identifying the target regions, when ranking the target regions identified in the main view and the secondary view, target regions identified in the main view and target regions identified in the secondary view may be respectively set with their respective predetermined weights, so as to consider importance of target regions identified in different views in a more balanced manner. Therefore, even if only a small target region is identified in the secondary view, the target region still has a chance to be selected as one of the target regions to be actually used later. Moreover, in some implementations, different weights may be set for different target regions identified in the secondary view. Assuming that a video of a streamer is presented in the secondary view, a target region identified on the streamer's body may have a higher weight than target regions identified in other parts of the secondary view, because that a viewer may pay more attention to the streamer's images compared to other parts in the secondary view. Similar to the above example of a dual-view video that includes a main view and a secondary view, for a multi-view video that includes three or more views having different sizes, respective predetermined weights may be set for target regions identified in different views, so as to consider importance of target regions identified in different views in a more balanced manner. Moreover, it should be understood that, for a multi-view video that includes two or more views having the same size or similar sizes, different weights may be set for target regions identified in different views, in consideration of at least a viewer's attention to different views. Taking an interview video containing two views that have the same size and correspond to a reporter and an interviewee respectively as an example, since a viewer usually pays more attention to the interviewee, higher weights may be set for target regions identified in the view of the interviewee. The embodiments of the present disclosure are not limited to the exemplary target region identifying strategies discussed above, but may cover any other target region identifying strategies directing to a multi-view video.

At 230, digital contents to be inserted may be determined. For example, the digital contents may be selected from candidate digital contents provided by a digital content provider. In an implementation, a profile of a user (e.g., a viewer) requesting a multi-view video may be obtained first, and digital contents may be selected based at least on the profile of the viewer. In an implementation, different digital contents may be determined for different target regions. In an implementation, matched digital contents may be selected based at least on attributes such as area, position, orientation, etc., of the target regions. In an implementation, the candidate digital contents provided by the digital content provider may be ranked based on various criteria, and thus, the digital contents may be selected based at least on the ranking of the candidate digital contents.

At 240, the multi-view video may be updated through adding the determined digital contents into the corresponding identified target regions. In an implementation, an original content in a target region may be overlaid by a digital content, so as to present the digital content in the target region. The overlaying may adopt various approaches such as full overlaying, semi-transparent overlaying, etc., wherein the full overlaying results in the presenting of only the digital content in the target region but the original content is invisible, while the semi-transparent overlaying results in the simultaneous presenting of the digital content and the original content in the target region but the displaying of the digital content is clearer. In an implementation, a digital content may be added into a target region in an immersive approach, so that the digital content visually looks like an element that originally existed in the multi-view video, and thus the digital content appears more natural and smooth. For example, the digital content may be presented by adopting a viewing angle, inclination, brightness, etc. similar to the original content in the target region, so as to achieve immersive digital content addition. In an implementation, a digital content may be simply added into a target region in a floating approach, so that the digital content is visually presented over the target region.

At 250, the updated multi-view video may be provided to the viewer. Thus, the updated multi-view video may be displayed on a terminal device of the viewer.

It should be understood that all the operations in the process 200 and their orders are exemplary, and depending on actual application scenarios and requirements, the operations in the process 200 may be arbitrarily added, deleted, modified, etc. For example, in the case that the digital contents are determined independently of the target regions, the determination of the digital contents at 230 may be performed before the identification of the target regions at 220. For example, in the case that a plurality of target regions are identified, a corresponding digital content may be individually determined and added for each target region. Moreover, optionally, the digital contents determined and inserted through the process 200 may change over time. For the same multi-view video, different digital contents may be determined at different times, thus causing to provide the multi-view video attached with different digital contents to a viewer at different times. For example, the candidate digital contents obtained from the digital content provider may be updated over time, thus causing to determine different digital contents at different times.

Figure 3:
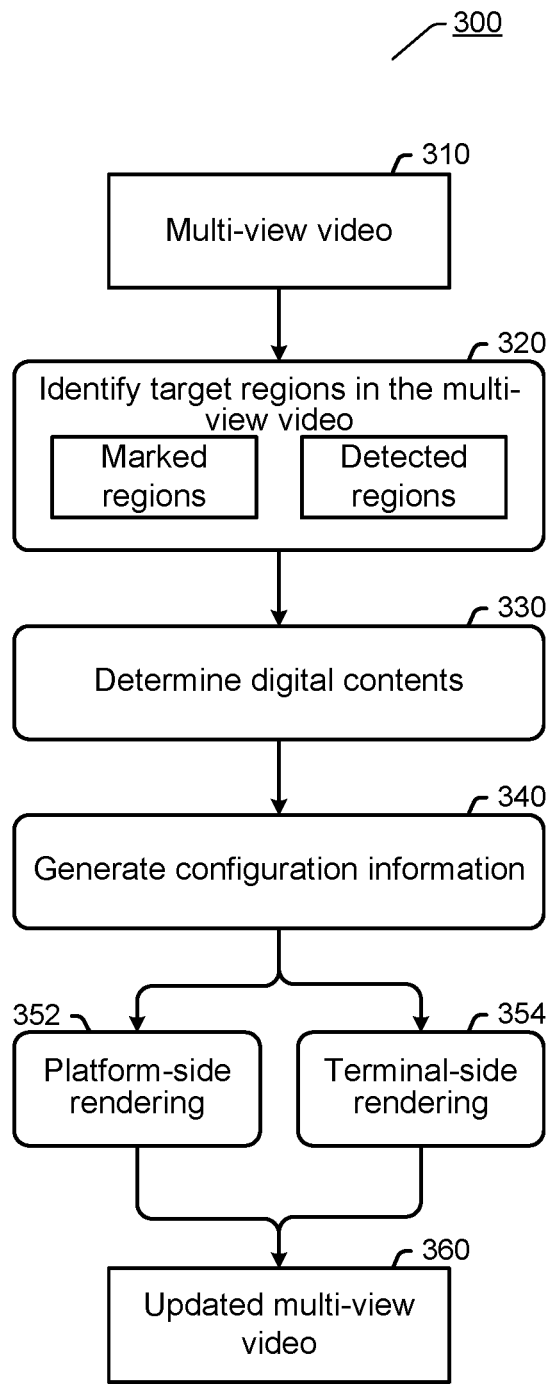
FIG. 3 illustrates an exemplary process of inserting digital contents into a multi-view video according to an embodiment.

FIG. 3 illustrates an exemplary process 300 of inserting digital contents into a multi-view video according to an embodiment. The process 300 may be performed for inserting digital contents into a multi-view video 310. The process 300 may be regarded as an exemplary implementation of the operations 220, 230, 240, etc., in the process 200 in FIG. 2.

The multi-view video 310 may be requested by, e.g., a viewer to a video service platform.

At 320, one or more target regions in the requested multi-view video may be identified. The processing at 320 may be regarded as an exemplary implementation of the processing at 220 in FIG. 2.

In an implementation, at 320, the target regions may be identified with reference to marked regions that were designated previously. In some cases, a provider of the multi-view video, e.g., a creator, owner, operator, etc., may previously designate at least one marked region in specific frames in the multi-view video as candidates of target regions into which digital contents may be added. The marked regions may be existing quadrilateral regions in the video, quadrilateral regions created in plane regions, etc. Taking a game streaming video as an example, the video provider may previously designate a marked region in a streamer view in a certain frame, e.g., a badge on the streamer's body, a photo frame behind the streamer, etc. and the video provider may also previously designate a marked region in a game view in a certain frame, e.g., a billboard, screen, car body, etc. appearing in the game view. During identifying the target regions, a designated marked region may be tracked in a plurality of consecutive frames adjacent to a frame in which the marked region is designated. The tracking of the marked region may be performed through any known target tracking technique. It may be determined, based on a result of the tracking, whether to determine the marked region as a target region within the set of frames being tracked. For example, if the duration of the marked region in the multi-view video reaches a predetermined threshold, i.e., there is enough time to present a digital content in this region, the marked region may be taken as a target region. Moreover, the result of the tracking may also be used, in subsequent processing, for guiding the addition of a digital content into the target region tracked in the corresponding set of frames.

In an implementation, at 320, candidate regions in the multi-view video may be automatically detected, so as to determine target regions from the candidate regions. Taking a game streaming video as an example, candidate regions in a game view and a streamer view contained in the game streaming video may be detected. The candidate regions may be existing quadrilateral regions in the video, quadrilateral regions created in plane regions, etc. Assuming that a candidate region is detected in a certain frame, the candidate region may be tracked in a plurality of consecutive frames adjacent to this frame. A result of the tracking may be used for determining whether to determine the candidate region as a target region in the set of frames being tracked, and used, in subsequent processing, for guiding the addition of a digital content into the target region tracked in the corresponding set of frames.

It should be understood that, optionally, the above approach that is based on marked regions and the approach of automatically detecting candidate regions may be combined together to determine a set of target regions for selection, and target regions to be used in subsequent processing may be selected from the set of target regions based on predetermined criteria.

At 330, digital contents to be inserted may be determined. The processing at 330 may correspond to the processing at 230 in FIG. 2.

After identifying the target regions and determining the digital contents, the process 300 may update the multi-view video through adding the determined digital contents into the corresponding identified target regions. Exemplarily, the process 300 may obtain an updated multi-view video by using configuration information and a rendering process which is based on the configuration information.

At 340, configuration information may be generated based at least on the identified target regions and the determined digital contents. The configuration information may be used for adding the digital contents into the target regions. For example, the configuration information may indicate into which target region a digital content will be added and what digital content will be added.

After the configuration information is generated, it may be used for performing rendering so as to update the multi-view video. In an implementation, the process 300 may perform platform-side rendering at 352. For example, the platform-side rendering may be performed at the video service platform based on the configuration information, so as to obtain an updated multi-view video 360. In an implementation, the process 300 may perform terminal-side rendering at 354. In one case, if the configuration information is generated at the video service platform or the digital content insertion processing platform, the original multi-view video and the configuration information may be sent to the viewer's terminal device, thereby triggering the terminal-side rendering to be performed at the terminal device based on the configuration information, so as to obtain the updated multi-view video 360. In one case, if the target regions are identified at the terminal device, the terminal device may generate the configuration information based on the identified target regions and the received digital contents, and perform the terminal-side rendering based on the configuration information so as to obtain the updated multi-view video 360. Exemplarily, the terminal-side rendering may be performed by e.g., a client, a browser, etc. on the terminal device.

In the case of performing the platform-side rendering, the video service platform may provide the obtained updated multi-view video 360 to the viewer's terminal device, so that the updated multi-view video 360 may be played on the terminal device for the viewer. In the case of performing the terminal-side rendering, the updated multi-view video 360 obtained at the terminal device may be directly played for the viewer.

Figure 4:
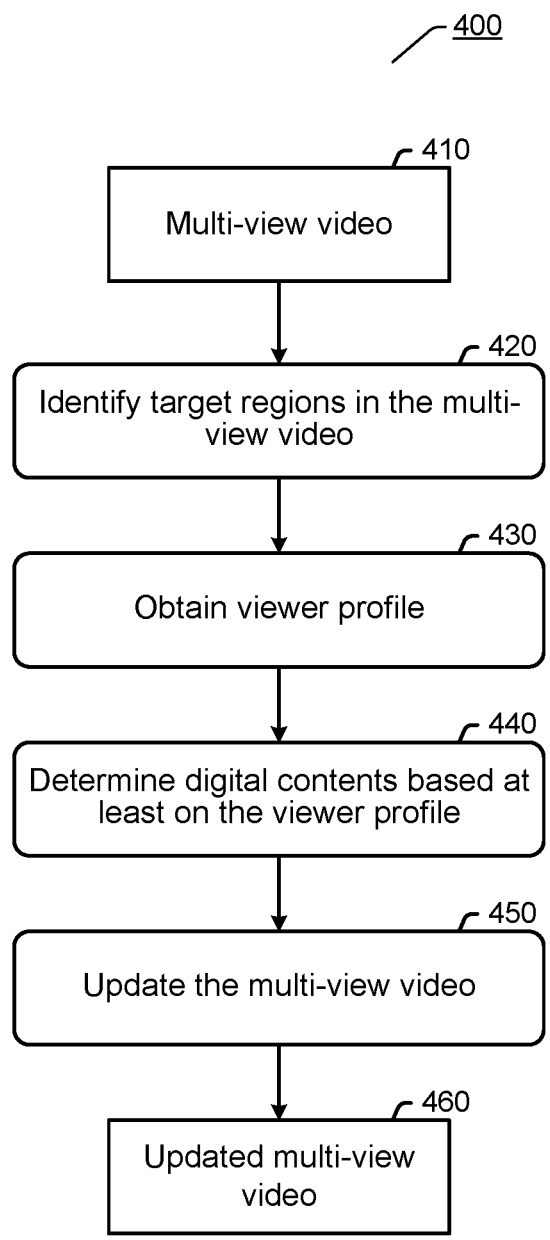
FIG. 4 illustrates an exemplary process of inserting digital contents into a multi-view video according to an embodiment.

FIG. 4 illustrates an exemplary process 400 of inserting digital contents into a multi-view video according to an embodiment. The process 400 may be regarded as an improvement of the process 300 in FIG. 3, which may implement personalized digital content playing for different viewers.

A multi-view video 410 may be requested by, e.g., a viewer to a video service platform.

At 420, one or more target regions in the requested multi-view video may be identified. The processing at 420 may correspond to the processing at 320 in FIG. 3.

According to the process 400, the process of determining digital contents may be based at least on a profile of a viewer, so that different digital contents may be selected for different viewers. Herein, a profile of a viewer may refer to various types of information about the viewer, e.g., gender, age, preferences, viewing history, etc. At 430, a profile of the viewer who requested the multi-view video 410 may be obtained. The profile of the viewer may be obtained through various approaches. For example, when the viewer accesses the video service platform, the viewer may log in through a specific account, and the video service platform may generate a profile of the viewer by using personal information, historical usage record, etc. associated with the account. At 440, digital contents corresponding to the viewer may be selected based at least on the profile of the viewer. For example, if the viewer is a young male who often watches football games, the selected digital contents may involve recommendations of sports products suitable for young males, e.g., men's football shoes, etc. Since different viewers have their own profiles, even for the same multi-view video, different digital contents may be selected for different viewers, thereby achieving personalized selecting and playing of digital contents. The processing at 430 and 440 may be regarded as an exemplary implementation of the processing at 230 in FIG. 2 and the processing at 330 in FIG. 3.

At 450, the multi-view video may be updated. The processing at 450 may correspond to the processing at 240 in FIG. 2 or the processing at 340, 352 and 354 in FIG. 3.

An updated multi-view video 460 obtained through the process 400 may then be played for the viewer that requested the multi-view video.

Figure 5:
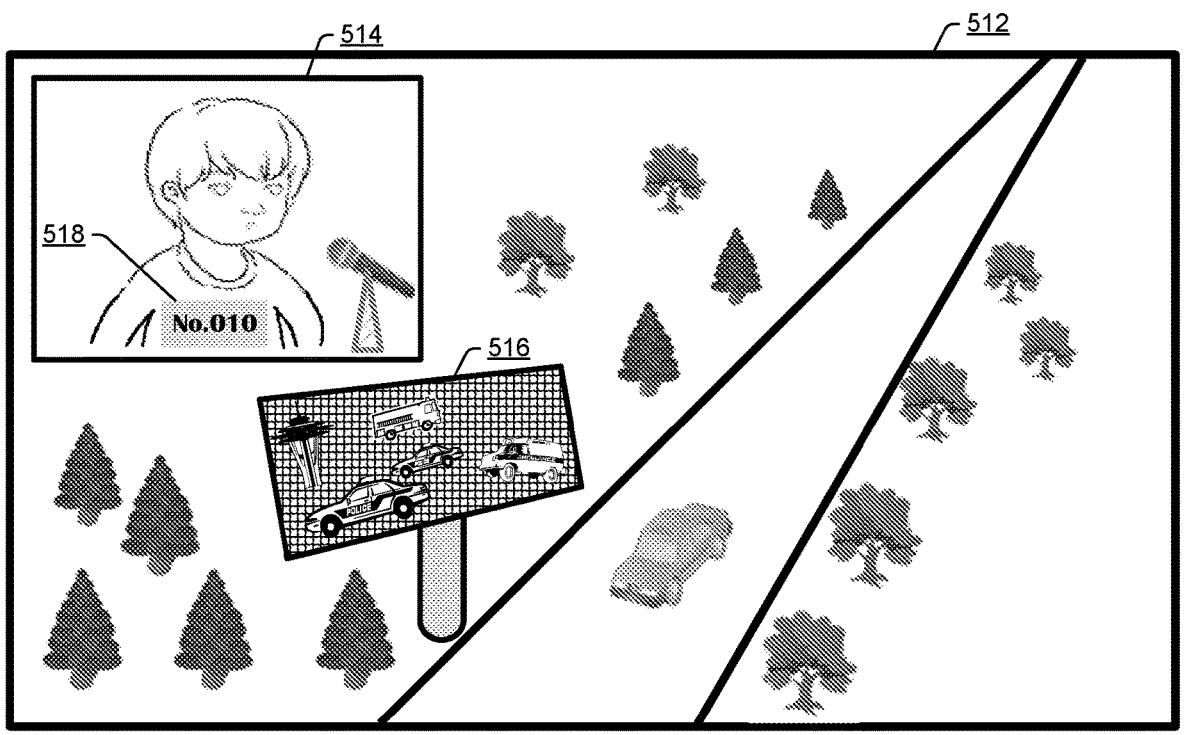
FIG. 5 illustrates an example of inserting digital contents into a multi-view video according to an embodiment.
Figure 5:
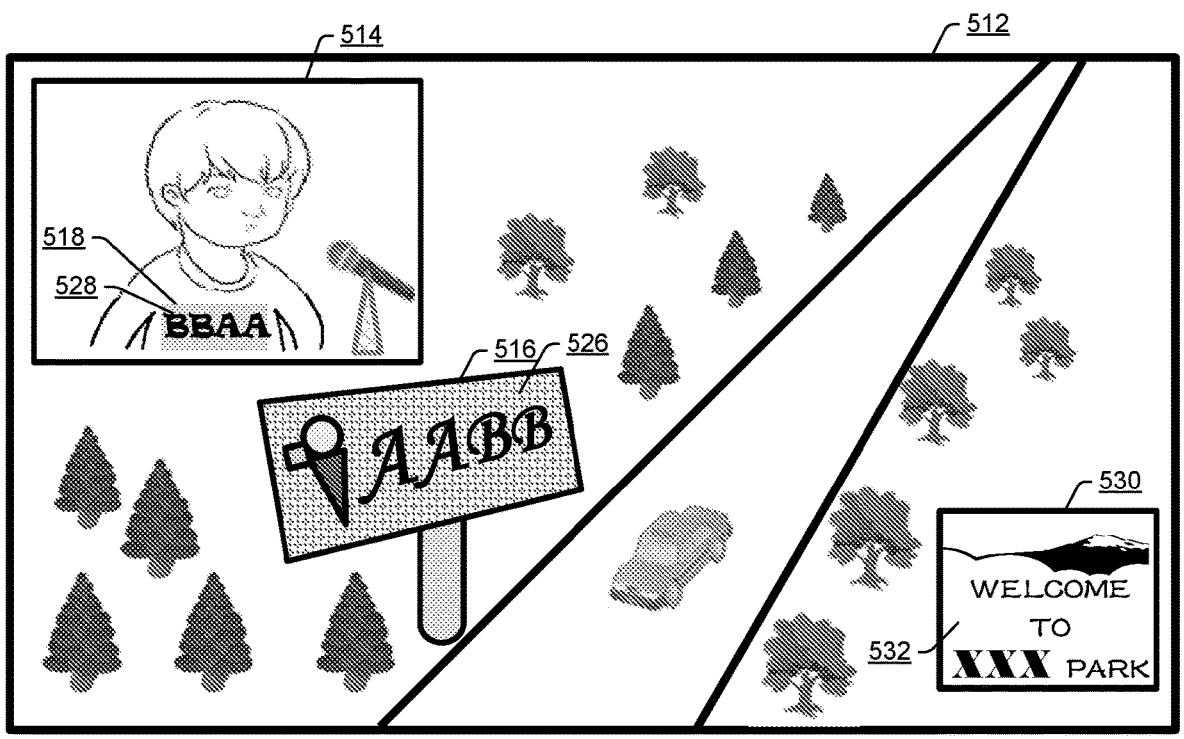

FIG. 5 illustrates an example of inserting digital contents into a multi-view video according to an embodiment. The example in FIG. 5 involves inserting digital contents into a game streaming video provided to viewers.

It is assumed that an image 510 is a frame of image in the original game streaming video. The image 510 includes a game view 512 which is currently displaying an image of a game that a game player is playing now. The image 510 may also include a streamer view 514 which is currently displaying an image of a game player.

According to the embodiments of the present disclosure, target regions may be identified from the original game streaming video. Taking the image 510 as an example, the game view 512 includes a quadrilateral region 516 which may be, e.g., a billboard, and thus, the quadrilateral region 516 may be identified as a target region. The streamer view 514 includes a quadrilateral region 518 which may be, e.g., a number card on the game player's body, and the quadrilateral region 518 may be identified as a target region. Moreover, it may also be detected that the lower right corner of the game view 512 contains a plane region, and thus, a quadrilateral region (not shown in the image 510) may be created in the plane region as a target region.

After a plurality of target regions are identified, a digital content corresponding to each target region may be determined according to the embodiments of the present disclosure, and the digital content may be added into the corresponding target region. It is assumed that an image 520 is an updated image formed after digital contents are added into the target regions in the image 510. In the image 520, the original content corresponding to the quadrilateral region 516 in the game view 512 is overlaid by a digital content 526 which is a logo of the "AABB" company, thereby forming an updated quadrilateral region 516. The original content corresponding to the quadrilateral region 518 in the streamer view 514 is overlaid by a digital content 528 which is a logo of a certain product, thereby forming an updated quadrilateral region 518. Moreover, a quadrilateral region 530 is created in the plane region at the lower right corner of the game view 512, and a digital content 532 is added into the quadrilateral region 530 which is a welcome message about "XXX Park".

As shown, in the image 520, the digital contents 526 and 528 are added into the target regions in an immersive approach, so that they visually look like elements that originally existed in the image. Moreover, the digital content 532 is added into the target region in a floating approach; however, since this target region is created in the plane region, obstruction of sight line may be avoided.

It should be understood that FIG. 5 only exemplarily shows the updating process of one frame of image in the game streaming video; in fact, similar processing may be performed on more frames of image in the game streaming video. Moreover, the digital contents 526, 528 and 532 shown in FIG. 5 may have various formats such as image, video, animation, etc. Taking a digital content in a video format as an example, it may present different images in different frames.

Figure 6:
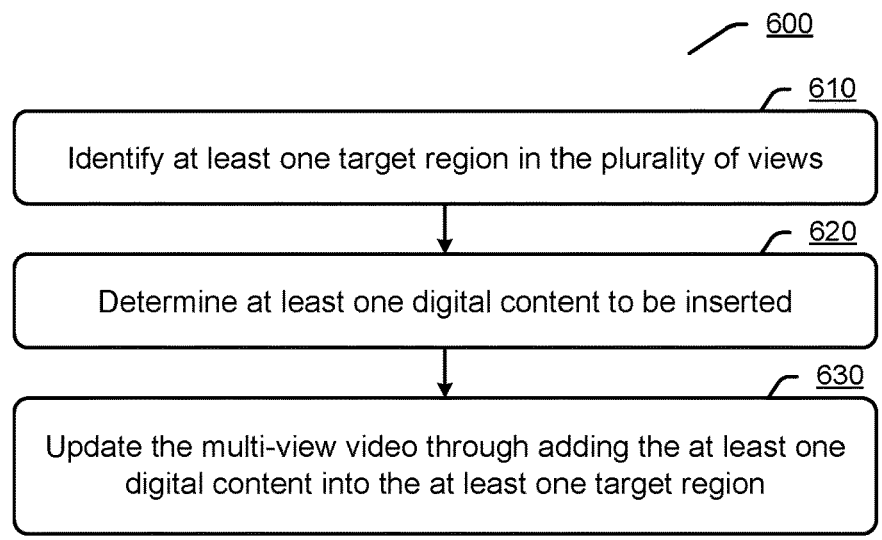
FIG. 6 illustrates a flowchart of an exemplary method for inserting digital contents into a multi-view video according to an embodiment.

FIG. 6 illustrates a flowchart of an exemplary method 600 for inserting digital contents into a multi-view video according to an embodiment. The multi-view video may comprise a plurality of views.

At 610, at least one target region in the plurality of views may be identified.

At 620, at least one digital content to be inserted may be determined.

At 630, the multi-view video may be updated through adding the at least one digital content into the at least one target region.

In an implementation, the updating the multi-view video may comprise: generating configuration information based at least on the at least one target region and the at least one digital content, the configuration information being for adding the at least one digital content into the at least one target region; and updating the multi-view video through rendering with the configuration information.

In an implementation, the method 600 may further comprise: providing the updated multi-view video.

In an implementation, the adding the at least one digital content into the at least one target region may comprise: overlaying an original content in the at least one target region by the at least one digital content.

In an implementation, the at least one digital content may be added into the at least one target region in an immersive approach.

In an implementation, the multi-view video may be a game streaming video, and the plurality of views may comprise a game view and a streamer view. The game streaming video may be live or previously-recorded.

In an implementation, the identifying at least one target region may comprise: obtaining at least one marked region that was designated previously; tracking the at least one marked region in a set of frames in the multi-view video; and determining the at least one marked region as the at least one target region in the set of frames.

In an implementation, the identifying at least one target region may comprise: detecting at least one candidate region in the plurality of views; tracking the at least one candidate region in a set of frames in the multi-view video; and determining the at least one candidate region as the at least one target region in the set of frames.

In an implementation, the at least one target region may comprise at least one of: a quadrilateral region detected in the plurality of views; and a quadrilateral region created in a plane region detected in the plurality of views.

In an implementation, the determining at least one digital content may comprise: selecting different digital contents for different viewers of the multi-view video.

In an implementation, the determining at least one digital content may comprise: obtaining a profile of a viewer of the multi-view video; and selecting the at least one digital content corresponding to the viewer based at least on the profile of the viewer.

In an implementation, the digital content may be at least one of image, video and animation.

It should be understood that the method 600 may further comprise any step/process for inserting digital contents into a multi-view video according to the embodiments of the present disclosure described above.

Figure 7:
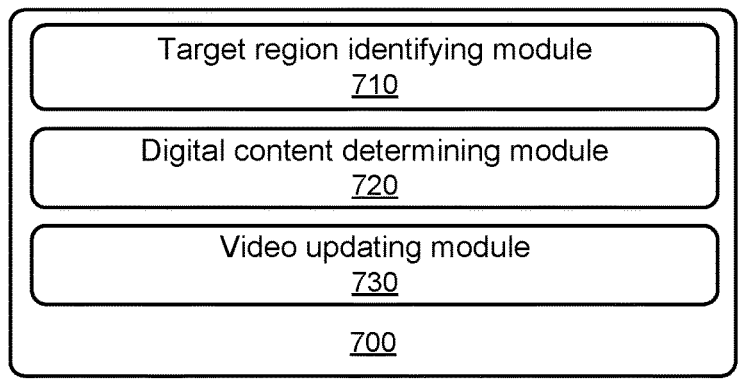
FIG. 7 illustrates an exemplary apparatus for inserting digital contents into a multi-view video according to an embodiment.

FIG. 7 illustrates an exemplary apparatus 700 for inserting digital contents into a multi-view video according to an embodiment. The multi-view video may comprise a plurality of views.

The apparatus 700 may comprise: a target region identifying module 710, for identifying at least one target region in the plurality of views; a digital content determining module 720, for determining at least one digital content to be inserted; and a video updating module 730, for updating the multi-view video through adding the at least one digital content into the at least one target region.

In an implementation, the video updating module 730 may be for: generating configuration information based at least on the at least one target region and the at least one digital content, the configuration information being for adding the at least one digital content into the at least one target region; and updating the multi-view video through rendering with the configuration information.

In an implementation, the multi-view video may be a game streaming video, and the plurality of views may comprise a game view and a streamer view.

In an implementation, the target region identifying module may be for: obtaining at least one marked region that was designated previously; tracking the at least one marked region in a set of frames in the multi-view video; and determining the at least one marked region as the at least one target region in the set of frames.

In an implementation, the target region identifying module may be for: detecting at least one candidate region in the plurality of views; tracking the at least one candidate region in a set of frames in the multi-view video; and determining the at least one candidate region as the at least one target region in the set of frames.

In an implementation, the digital content determining module may be for: selecting different digital contents for different viewers of the multi-view video.

Moreover, the apparatus 700 may further comprise any other module that performs the steps of the methods for inserting digital contents into a multi-view video according to the embodiments of the present disclosure described above.

Figure 8:
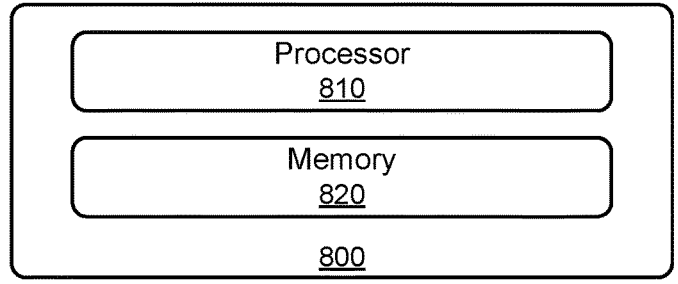
FIG. 8 illustrates an exemplary apparatus for inserting digital contents into a multi-view video according to an embodiment.

FIG. 8 illustrates an exemplary apparatus 800 for inserting digital contents into a multi-view video according to an embodiment. The multi-view video may comprise a plurality of views.

The apparatus 800 may comprise: at least one processor 810; and a memory 820 storing computer-executable instructions. When the computer-executable instructions are executed, the at least one processor 810 may: identify at least one target region in the plurality of views; determine at least one digital content to be inserted; and update the multi-view video through adding the at least one digital content into the at least one target region. Moreover, the processor 810 may further perform any other step/process of the methods for inserting digital contents into a multi-view video according to the embodiments of the present disclosure described above.

The embodiments of the present disclosure may be embodied in a non-transitory computer-readable medium. The non-transitory computer readable medium may comprise instructions that, when executed, cause one or more processors to perform any operation of the methods for inserting digital contents into a multi-view video according to the embodiments of the present disclosure as described above.

It should be appreciated that all the operations in the methods described above are merely exemplary, and the present disclosure is not limited to any operations in the methods or sequence orders of these operations, and should cover all other equivalents under the same or similar concepts.

It should also be appreciated that all the modules in the apparatuses described above may be implemented in various approaches. These modules may be implemented as hardware, software, or a combination thereof. Moreover, any of these modules may be further functionally divided into sub-modules or combined together.

Processors have been described in connection with various apparatuses and methods. These processors may be implemented using electronic hardware, computer software, or any combination thereof. Whether such processors are implemented as hardware or software will depend upon the particular application and overall design constraints imposed on the system. By way of example, a processor, any portion of a processor, or any combination of processors presented in the present disclosure may be implemented with a microprocessor, microcontroller, digital signal processor (DSP), a field-programmable gate array (FPGA), a programmable logic device (PLD), a state machine, gated logic, discrete hardware circuits, and other suitable processing components configured to perform the various functions described throughout the present disclosure. The functionality of a processor, any portion of a processor, or any combination of processors presented in the present disclosure may be implemented with software being executed by a microprocessor, microcontroller, DSP, or other suitable platform.

Software shall be construed broadly to mean instructions, instruction sets, code, code segments, program code, programs, subprograms, software modules, applications, software applications, software packages, routines, subroutines, objects, threads of execution, procedures, functions, etc. The software may reside on a computer-readable medium. A computer-readable medium may include, by way of example, memory such as a magnetic storage device (e.g., hard disk, floppy disk, magnetic strip), an optical disk, a smart card, a flash memory device, random access memory (RAM), read only memory (ROM), programmable ROM (PROM), erasable PROM (EPROM), electrically erasable PROM (EEPROM), a register, or a removable disk. Although a memory is shown as being separate from the processor in various aspects presented in this disclosure, a memory may also be internal to the processor (e.g., a cache or a register).

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein. All structural and functional equivalents to the elements of the various aspects described throughout the present disclosure that are known or later come to be known to those of ordinary skilled in the art are intended to be encompassed by the claims.

The invention claimed is:

1. A method for inserting digital contents into a multi-view video, the multi-view video containing a plurality of views, the method comprising:
   identifying at least one target region in the plurality of views where each view is shown simultaneously;
   determining at least one digital content to be inserted; and
   updating each view in the multi-view video through adding the at least one digital content into the at least one target region.

2. The method of claim 1, wherein the updating each view in the multi-view video comprises:
   generating configuration information based at least on the at least one target region and the at least one digital content, the configuration information being for adding the at least one digital content into the at least one target region; and
   updating the multi-view video through rendering with the configuration information.

3. The method of claim 1, further comprising:
   providing the updated multi-view video.

4. The method of claim 1, wherein the adding the at least one digital content into the at least one target region comprises:
overlaying an original content in the at least one target region by the at least one digital content.

5. The method of claim 1, wherein the at least one digital content is added into the at least one target region in an immersive approach.

6. The method of claim 1, wherein the multi-view video is a game streaming video, and the plurality of views comprise a game view and a streamer view.

7. The method of claim 1, wherein the identifying at least one target region comprises:
obtaining at least one marked region that was designated previously;
tracking the at least one marked region in a set of frames in each view of the multi-view video; and
determining the at least one marked region as the at least one target region in the set of frames.

8. The method of claim 1, wherein the identifying at least one target region comprises:
detecting at least one candidate region in each view of the plurality of views;
tracking the at least one candidate region in a set of frames in the multi-view video; and
determining the at least one candidate region as the at least one target region in the set of frames.

9. The method of claim 1, wherein the at least one target region comprises at least one of:
a quadrilateral region detected in the plurality of views; and
a quadrilateral region created in a plane region detected in the plurality of views.

10. The method of claim 1, wherein the determining at least one digital content comprises:
selecting different digital contents for different viewers of the multi-view video.

11. The method of claim 1, wherein the determining at least one digital content comprises:
obtaining a profile of a viewer of the multi-view video; and
selecting the at least one digital content corresponding to the viewer based at least on the profile of the viewer.

12. The method of claim 1, wherein the digital content is at least one of image, video and animation.

13. The method of claim 6, wherein
the game streaming video is live or previously-recorded.

14. An apparatus for inserting digital contents into a multi-view video, the multi-view video containing a plurality of views, the apparatus comprising:
a target region identifying module, for identifying at least one target region in the plurality of views where each view is shown simultaneously;
a digital content determining module, for determining at least one digital content to be inserted; and
a video updating module, for updating each view in the multi-view video through adding the at least one digital content into the at least one target region.

15. An apparatus for inserting digital contents into a multi-view video, the multi-view video containing a plurality of views, the apparatus comprising:
at least one processor; and
a memory storing computer-executable instructions that, when executed, cause the at least one processor to:
identify at least one target region in the plurality of views where each view is shown simultaneously,
determine at least one digital content to be inserted, and
update each view in the multi-view video through adding the at least one digital content into the at least one target region.

* * * * *